United States Patent [19]

Stone, Jr.

[11] 3,709,087
[45] Jan. 9, 1973

[54] TORQUE LIMITING THREADED FASTENER

[76] Inventor: Wayne B. Stone, Jr., 7307 Nevis Road, Bethesda, Md. 20034

[22] Filed: Sept. 10, 1970

[21] Appl. No.: 70,994

[52] U.S. Cl. ..................................85/61, 81/52.4
[51] Int. Cl. ..............................................F16b 31/02
[58] Field of Search ..............85/61; 151/52; 81/52.4

[56] References Cited

UNITED STATES PATENTS

| 2,366,257 | 1/1945 | Hartley | 85/61 |
| 3,289,524 | 12/1966 | Rubin | 85/61 |

Primary Examiner—Edward C. Allen
Attorney—Wayne B. Stone, Jr.

[57] ABSTRACT

A torque limiting threaded fastener defined by a conventional nut or bolthead and a surrounding, geometrically similar driver resiliently interconnected with the normal torque applying faces of the conventional nut or bolthead.

7 Claims, 11 Drawing Figures

PATENTED JAN 9 1973 3,709,087
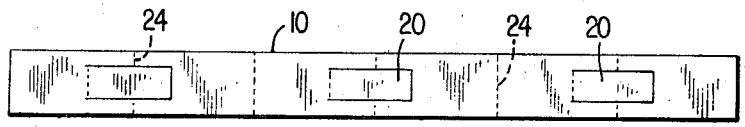
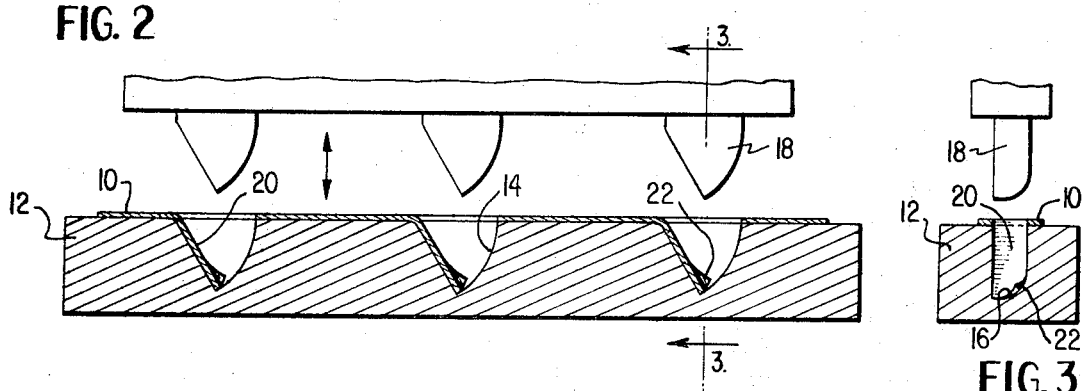
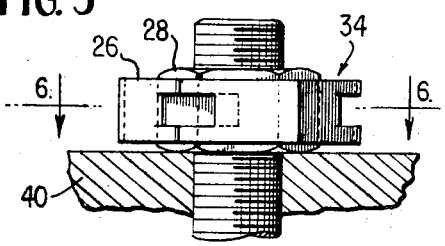
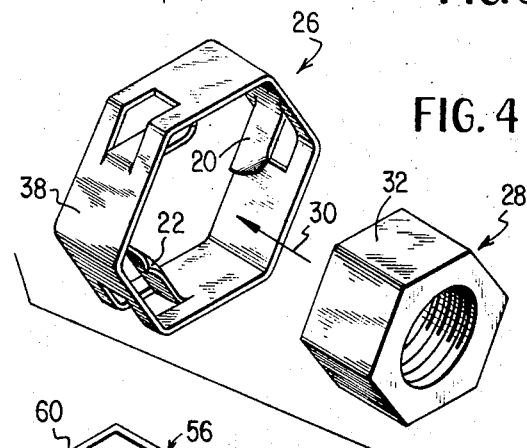
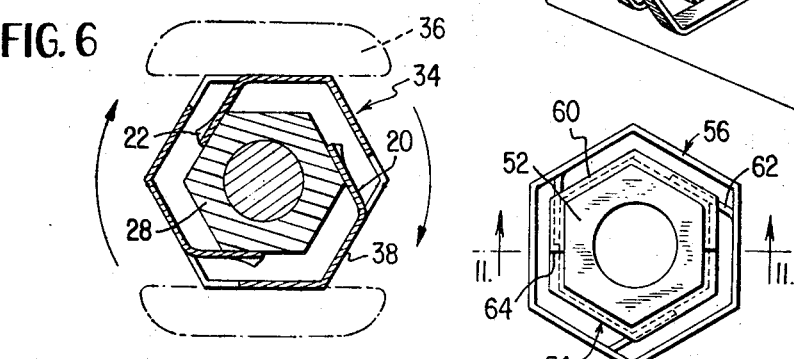
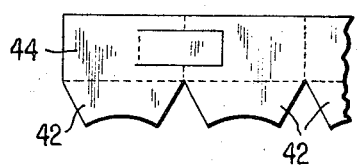
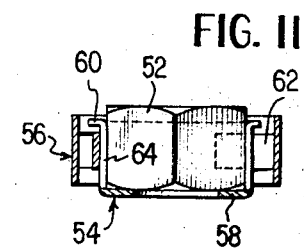
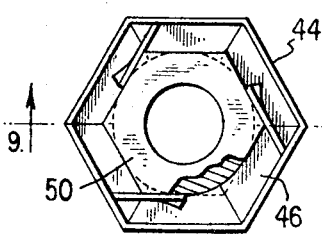
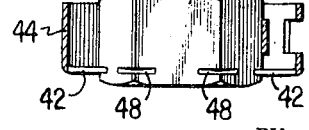
INVENTOR
WAYNE B. STONE, JR.
BY Wayne B. Stone Jr.
ATTORNEY

TORQUE LIMITING THREADED FASTENER

BACKGROUND OF THE INVENTION

Torque limiting wrenches are conventionally used to apply a predetermined torque to threaded fasteners. These wrenches are relatively expensive and are not always available to manufacturer's field personnel, small machine shops and home mechanics. Consequently, torque limiting nuts are frequently used in original assembly operations where there is likelihood that the nuts may become loose in service and require tightening in the field. This is particularly common in the aircraft industry where many military and civilian specifications require the use of torque limiting nuts for certain applications. Their use is more limited in other areas because of their substantial expense; it being more economical in the long run to purchase torque limiting wrenches.

Known torque limiting nuts require the fabrication of special threaded elements and clutching components which explains their substantial expense. One typical nut of this type involves two coacting threaded elements having opposed ratchet teeth formed thereon and pressed into driving engagement by a belleville washer supported on the assembly by a separate fastener.

SUMMARY OF THE INVENTION

The purpose of the invention is to provide an inexpensive torque limiting threaded fastener and, as an ancillary factor, to provide an inexpensive adapter which will convert an ordinary wrench into a torque limiting wrench.

The invention resides in the use of a socket element or driver, adapted to be torqued by a conventional wrench, which surrounds and is resiliently interconnected with the normal torque applying surfaces of a conventional threaded fastener thus obviating the necessity of fabricating a special nut or bolt. The socket element is supported in spaced telescopic relationship to the nut or bolthead by the resilient interconnection and the spacing is sufficient to permit relative rotation between the ut or bolthead and socket when the applied torque exceeds the bias of the resilient interconnection.

DESCRIPTION OF THE DRAWINGS

FIG. 1 is a plan view of a blank from which the driver or socket element may be fabricated;

FIG. 2 is a sectional view of the blank of FIG. 1 undergoing a first die forming operation with an associated punch being fragmentarily shown in elevation;

FIG. 3 is a sectional view taken along line 3—3 of FIG. 2;

FIG. 4 is a perspective view illustrating the assembly of a conventional nut with the finished driver;

FIG. 5 is an elevational view of the assembled torque limiting nut applied to a bolt, and threaded down against a panel member;

FIG. 6 is a sectional view of the torque limiting nut and bolt taken along the line 6—6 of FIG. 5 and illustrating, in phantom lines, the application of a torquing force to the nut;

FIG. 7 is a fragmentary plan view of a blank used to fabricate a modified torque limiting nut;

FIG. 8 is a partially broken plan view of a torque limiting nut employing the blank of FIG. 7;

FIG. 9 is a sectional view of the driver taken along the line 9—9 of FIG. 8 with the conventional nut being shown in elevation;

FIG. 10 is a plan view of a second embodiment employing a sleeve retainer to preclude disassembly of the torque limiting nut in a service environment; and FIG. 11 is a sectional view taken along line 11—11 of FIG. 10 with the conventional nut being shown in elevation.

DESCRIPTION OF THE PREFERRED EMBODIMENTS

The invention is herein illustrated in conjunction with a conventional hex nut to exemplify the principles which are equally applicable to a bolthead or other conventionally configured nut, such as one having twelve sides.

A spring metal blank 10, such as a high carbon steel or a hardenable 400 series stainless steel, is shown in FIG. 1 wherein the solid lines indicate where a shearing operation will occur and the dotted lines represent bending lines. The blank 10 is placed on a die 12 overlying recesses 14 having a lower reentrant portion 16 adapted to coact with similarly formed punches 18 to form struck out resilient tangs or fingers 20 whose remote ends have one edge thereof turned upwardly at approximately 45° to form a cam surface 22. The blank is then removed from the die and formed into a closed hexagonal shape as by bending along the dotted lines 24 shown in FIG. 1 and the opposed ends are rigidly secured to form the completed driver or socket element 26 having circumferentially continuous portions or driver means on either side of the struck out tangs. If the blank 10 was a hardenable material, it is next hardened prior to assembly with a conventional hex nut 28 as by the forcible telescopic engagement of the two as indicated by the arrow 30 in FIG. 4. The diameter of a circle whose circumference passes through the innermost ends of the unflexed fingers 20 prior to the assembly step of FIG. 4 has a lesser diameter than the smallest diameter of hex nut 28, i.e., a diameter which is perpendicular to one of the flat torque applying faces 32. Telescopic assembly of the hex nut and driver is made possible by cam surfaces 22 which cams fingers 20 outwardly upon initial engagement with the corresponding edges of the flat hex nut surfaces 32.

The completed assembly forming a torque limiting nut 34 is shown in FIGS. 5 and 6 wherein driver 26 exerts a strong frictional grip on three of the hex nut surfaces 32 through the flexed spring fingers 20. Self torquing nut 34 may be tightened by a conventional wrench 36 applied to opposed torque applying surfaces 38 on driver 26. It will be apparent that torque applied to driver 26 will be transmitted to hex nut 28 until such time as the applied torque exceeds the resilient bias of spring fingers 20. When the applied torque which can be transmitted by spring fingers 20 is exceeded, the fingers will yield and driver 26 will rotate about the now stationary hex nut. It is, of course, apparent that the spacing between the circumferentially continuous portions of the driver and the hex nut must be sufficient to permit relative rotation therebetween. After hex nut 28 has been tightened the driver may be removed, if desired, by inserting a screwdriver beneath the lower surface thereof and prising upwardly against a secured structural member 40.

The embodiment shown in FIGS. 7–9 differs from that previously described in the provision of a plurality of discrete inturned projections 42 on a driver 44 forming a continuous flange 46 adapted to engage a plurality of shallow grooves 48 machined at the angles of hex nut 50. This provides a mechanical interlock between the driver and hex nut precluding their disassembly at all times. The discrete projections 42 forming the inturned flange 46 are sufficiently resilient to yield slightly as the nut and driver are being assembled and then snap into the shallow grooves 48.

The torque limiting nut shown in FIGS. 10 and 11 retains the advantages of the first described embodiment utilizing a conventional nut that does not require any modification, such as the grooves 48 in the second embodiment, while yet maintaining a positive interlocked assembly under service conditions. Basically, a conventional nut 52 is telescopically assembled with a similarly configured, split retainer sleeve 54 which fits snugly against the sides of the nut before the assembled nut and retainer are assembled with a driver 56 which is identical to the driver 26 shown in FIG. 4. Retainer sleeve 54 need not be formed from spring material but may be made in the configuration shown in FIG. 11 in any desired manner such as by casting, stamping or the like. Sleeve 54 includes an inwardly turned flange 58 adapted to abut the lower surface of nut 52, as viewed in FIG. 11, whereby the same will be clamped between nut 52 and the structural member through which the associated bolt will extend. The other end of the retainer sleeve is formed with an outwardly turned flange 60 which will overlie spring fingers 62 when the driver 56 is subsequently assembled with the nut and retainer sleeve. This latter assembly is effected in the same manner as that described in connection with FIG. 4 with the hexagonal sides of retainer sleeve 54 being pressed tightly against the corresponding sides of nut 52 by the bias of spring fingers 62. The diametrically opposed split lines 64 extend through upper flange 60 and the sleeve body to terminate at the level of lower flange 58. The use of a split retainer sleeve permits greater manufacturing tolerances and allows the sleeve to flex slightly under the bias of spring fingers 62 to more snugly engage the sides of nut 52. The sleeve retainer may be split at each corner, if desired, to facilitate fabrication by stamping.

In operation, the completed torque limiting nut shown in FIGS. 10 and 11 is threaded onto a bolt and as the torquing forces are increased clamping flange 58 between nut 52 and a structural member, retainer sleeve 54 acts as an integral part of nut 52 since it can not move relative thereto. Thus, the driver acts in relation to the nut-retainer combination in the same manner as was described in connection with the embodiment shown in FIGS. 5 and 6. It will be apparent that driver 56 cannot be removed from retainer sleeve 54 because of the flange 60 overlying fingers 62.

In order to loosen the self torquing nuts shown in FIGS. 8, 9 and 10, 11 which will normally require the application of a substantially greater untorquing force than was necessary to torque the same; the point of a screwdriver may be inserted between the driver and nut of FIGS. 8 and 9 or between the driver and retainer sleeve of FIGS. 10 and 11. The screwdriver thus serves as a solid abutment precluding relative rotation of the driver and substantial untorquing forces may thus be transmitted from the driver to the nut.

Alternatively, in the embodiment of FIGS. 10 and 11, raised protuberances could be cast integrally with the outer hexagonal periphery of retainer 64 just ahead of the remote ends of spring fingers 62, as viewed in a counter-clockwise direction, so that upon the application of an untorquing force of sufficient magnitude to initiate relative rotation between the driver and retainer, the two would be positively coupled for counter-clockwise rotation.

In an application of any of the three embodiments to a relatively small threaded fastener where the necessary width of spring fingers 20, 62 is wide in comparison to the width of the blank from which they are struck thus rendering the driver circumferentially weakened; a second solid cast driver may be tightly interfitted about any of the drivers 26, 44, 54. Alternatively, in the case of a low profile nut, the circumferentially continuous portion of the driver may lie above the nut.

It is obvious that if a self locking fastener is required, the driver may be assembled with any of a plurality of conventional self locking nuts. Furthermore, in the event locking wires are required they may be threaded through the openings left by the struck out spring fingers or, in the case of the FIG. 10 embodiment, locking wire holes could be cast integrally with flange 60.

I claim:

1. A torque limiting fastener, comprising; a rotatable threaded fastener including a plurality of flat torque applying surfaces tangentially disposed to a common circle the center of which lies on the rotational axis of said fastener, circumferentially continuous driver means comprising a peripheral band having a like number of flat torque applying surfaces, relation to said flat torque applying surfaces of said fastener in spaced concentric relationship thereto, and said torque transmitting means including yieldable fingers struck from said band at the corners thereof, whereby said driver means may rotate relative to said threaded fastener upon application of excessive torque.

2. The torque limiting fastener of claim 1 wherein said yieldable means are in direct torque transmitting engagement with said flat torque applying surfaces.

3. The torque limiting fastener of claim 2 including means coacting between said driver and fastener for precluding relative movement in at least one axial direction.

4. The torque limiting fastener of claim 1 wherein said torque transmitting means further include retainer means non-rotatably mounted on said threaded fastener, and said yieldable means directly engaging said retainer means.

5. The torque limiting fastener of claim 4 wherein said retainer means includes an inwardly directed flange adapted to be clamped between said fastener and a fastened structure, and an outwardly directed flange for precluding substantial axial movement of said driver means relative to said threaded fastener.

6. A self torquing nut, comprising; a nut having conventional torque applying faces lying tangent to a common circle, circumferentially continuous driver means comprising a peripheral band having a like number of flat torque applying surfaces, a plurality of yieldable fingers struck from said band at the corners thereof and extending inwardly from said peripheral band for mounting said driver means in torque transmitting spaced telescopic relationship to said nut, said fingers including resilient means adapted to yield upon the exertion of a predetermined torque, and all diameters of said driver means exceeding all diameters of said nut whereby the driver may rotate relative to said nut upon the application of excessive torque.

7. The self torquing nut of claim 6 including means for precluding movement of said driver means relative to said nut in at least one axial direction.

* * * * *